US008320545B2

(12) United States Patent
Toebes et al.

(10) Patent No.: US 8,320,545 B2
(45) Date of Patent: Nov. 27, 2012

(54) SYSTEM, METHOD, AND LOGIC FOR DETERMINING PRESENCE STATUS ACCORDING TO THE LOCATION OF ENDPOINTS

(75) Inventors: John A. Toebes, Cary, NC (US); Denise G. Caballero-McCann, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1107 days.

(21) Appl. No.: 11/774,007

(22) Filed: Jul. 6, 2007

(65) Prior Publication Data

US 2009/0010419 A1 Jan. 8, 2009

(51) Int. Cl.
*H04M 3/42* (2006.01)

(52) U.S. Cl. ............ 379/201.1; 379/201.01; 379/207.12

(58) Field of Classification Search ............ 379/201.01, 379/201.1, 207.12; 709/224, 203, 204; 455/41.2, 455/404.2, 456.1
See application file for complete search history.

(56) References Cited

U.S. PATENT DOCUMENTS

| | | | |
|---|---|---|---|
| 6,658,095 B1 | 12/2003 | Yoakum et al. | |
| 6,714,519 B2 | 3/2004 | Luzzatti et al. | |
| 6,735,287 B2 | 5/2004 | Vishik et al. | |
| 6,757,722 B2 | 6/2004 | Lönnfors et al. | |
| 6,807,423 B1 | 10/2004 | Armstrong et al. | |
| 6,839,735 B2 | 1/2005 | Wong et al. | |
| 6,853,634 B1 | 2/2005 | Davies et al. | |
| 6,934,380 B2 | 8/2005 | Shaffer et al. ............ 379/265.03 |
| 6,993,327 B2 | 1/2006 | Mathis | |
| 7,433,920 B2 | 10/2008 | Blagsvedt et al. | |
| 7,593,984 B2 * | 9/2009 | Morris ........................ 709/203 |
| 2004/0059781 A1 | 3/2004 | Yoakum et al. | |
| 2005/0068167 A1 | 3/2005 | Boyer et al. | |
| 2005/0198321 A1 | 9/2005 | Blohm | |
| 2006/0013140 A1 | 1/2006 | Pushparaj ................... 370/241 |
| 2006/0015609 A1 | 1/2006 | Hagale et al. | |
| 2006/0030264 A1 * | 2/2006 | Morris ........................ 455/41.2 |
| 2007/0198696 A1 | 8/2007 | Morris | |
| 2008/0065755 A1 * | 3/2008 | Caspi et al. ................. 709/224 |
| 2008/0244005 A1 * | 10/2008 | Sengupta et al. ............ 709/204 |
| 2009/0282147 A1 * | 11/2009 | Morris ........................ 709/224 |

FOREIGN PATENT DOCUMENTS

| | | |
|---|---|---|
| CN | 1692400 A | 11/2005 |
| EP | 1 416 696 | 5/2004 |

OTHER PUBLICATIONS

Pending U.S. Appl. No. 11/277,201 entitled, *"Providing an Aggregate Reachability Status"*, 32 pages specification, claims and abstract, 7 pages of drawings, inventors Kathleen A. McMurry et al., filed Mar. 22, 2006.

Rosenberg, *"Presence Authorization Rules"*, www.softarmor.com/wgdb/docs/draft-ietf-simple-presence-rules-02.txt, 27 pages, Feb. 21, 2005.

(Continued)

*Primary Examiner* — Thjuan K Addy
(74) *Attorney, Agent, or Firm* — Baker Botts L.L.P.

(57) ABSTRACT

Determining presence status associated with a user includes receiving presence statuses of endpoints associated with a first user. It is determined whether an endpoint exhibits significant activity. If an endpoint exhibits significant activity, it is determined whether any other endpoint is co-located with that endpoint. An aggregate presence status is generated from the presence status of the at least one endpoint and presence status of the other endpoint.

21 Claims, 2 Drawing Sheets

OTHER PUBLICATIONS

Microsoft OfficeOnline, "*Live Communications Server Feature Comparison*", www.microsoft.com/office/livecomm/prodinfo/compare.mspx?pf=true, 5 pages, Apr. 5, 2005.

Microsoft OfficeOnline, "*Live Communications Server 2005 Overview*," www.microsoft.com//office/livecomm/prodinfo/overview.mspx?pf=true, 3 pages, Apr. 26, 2005.

Rosenberg, "*Presence Authorization Rules*," www.softarmor.com/wgdb/docs/draft-ietf-simple-presence-rules-04.txt, 27 pages, Oct. 24, 2005.

USPTO, Office Action, U.S. Appl. No. 11/277,201, 25 pages, Jan. 7, 2009.

PCT International Search Report and Written Opinion (ISA/US) for PCT/US07/01390, 9 pages, Oct. 19, 2007.

USPTO, Final Office Action, U.S. Appl. No. 11/277,201, 24 pages, Jun. 17, 2009.

USPTO, Advisory Action, U.S. Appl. No. 11/277,201, 3 pages, Sep. 2, 2009.

The First Office Action issued by the State Intellectual Property Office of the People's Republic of China; Filing No. 200780003553.0, 8 pages, Oct. 9, 2009.

USPTO, Examiner's Answer, U.S. Appl. No. 11/277,201, 25 pages, Mar. 10, 2010.

USPTO, Office Communication, U.S. Appl. No. 11/277,201, 2 pages, Apr. 1, 2010.

The Second Office Action issued by The Patent Office of the People's Republic of China; Application No. 200780003553.0, Serial No. 2010040900442780, 16 pages, Apr. 14, 2010.

USPTO, Office Communication, U.S. Appl. No. 11/277,201, 2 pages, Jun. 4, 2010.

European Patent Office Communication (EPO) and extended search report for Application No. 07748982.1-1244 (7 pages) Dec. 14, 2011.

The Patent Office of the People's Republic of China; The Fourth Office Action; for Application No. 200780003553.0 (17 pages), Nov. 23, 2011.

Third Office Action issued by the Patent Office of the People's Republic of China; Application No. 200780003553.0, Chinese Office Action and English translation, 24 pages, Jun. 16, 2011.

The Patent Office of the People's Republic of China; The Fifth Office Action; for Application No. 200780003553.0 (17 pages including translation), May 23, 2012.

\* cited by examiner

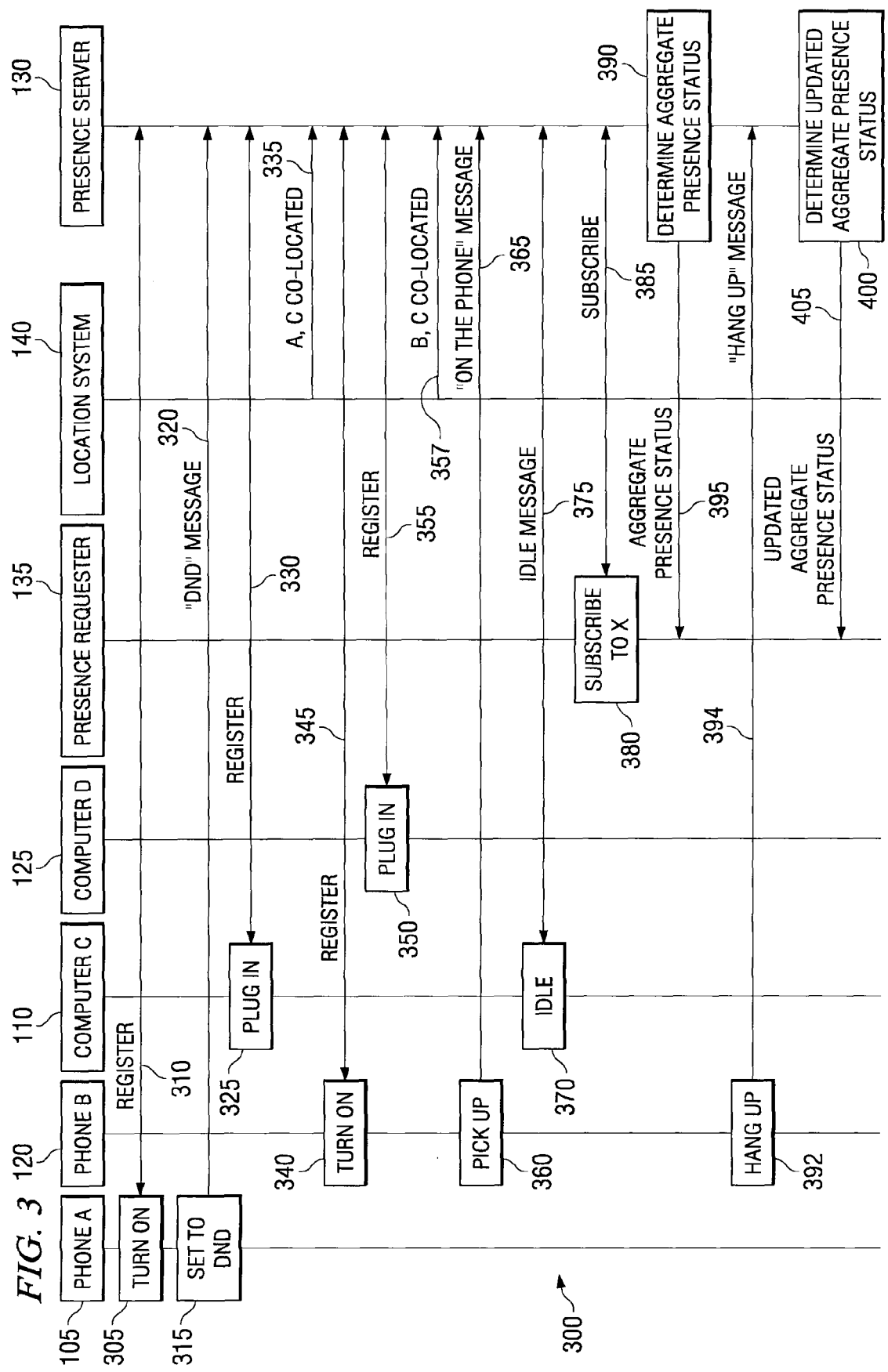

SYSTEM, METHOD, AND LOGIC FOR DETERMINING PRESENCE STATUS ACCORDING TO THE LOCATION OF ENDPOINTS

TECHNICAL FIELD

This invention relates in general to telecommunications, and more particularly to determining presence status according to the location of endpoints.

BACKGROUND

The presence status of an endpoint generally describes the current availability of an endpoint to communicate with another endpoint. For example, a user may be using a phone and a personal computer (PC). The phone and PC may have "available" states indicating that the endpoints are available. The user then may put the phone in a "do not disturb" state, and the PC may eventually go to an idle state indicating that the endpoints are not available. Accordingly, each of the user endpoints has a presence status given by a presence state.

SUMMARY OF THE DESCRIPTION

In accordance with one embodiment, a method of determining presence status associated with a user includes receiving presence statuses endpoints associated with a first user. It is determined whether an endpoint exhibits significant activity. If an endpoint exhibits significant activity, it is determined whether any other endpoint is co-located with that endpoint. An aggregate presence status is generated from the presence status of the at least one endpoint and presence status of the other endpoint.

In accordance with another embodiment, logic for determining a presence status associated with a user is embodied in computer-readable storage media and is operable to receive presence statuses of endpoints associated with a first user. The logic establishes whether an endpoint exhibits significant activity and, if so, determines whether there is any other endpoint that is co-located with that endpoint. The logic is further operable to generate an aggregate presence status from the presence status of the at least one endpoint and presence status of the other endpoint.

In accordance with still another embodiment, a presence server operable to determine a presence status associated with a user includes a memory and one or more processors. The memory stores presence statuses of endpoints. The one or more processors are operable to establish whether an endpoint exhibits significant activity and, if so, determines whether any other endpoint is co-located with that endpoint. The one or more processors are further operable to generate an aggregate presence status from the presence status of the at least one endpoint and presence status of the other endpoint.

Certain embodiments of the invention may provide one or more technical advantages. A technical advantage of one embodiment may be that an aggregate presence status associated with a user having multiple endpoints may be generated. The aggregate presence status describes the availability of the user as well as the capabilities of the user endpoints available to the user. Another technical advantage of one embodiment may be that the aggregate presence status describes user endpoints that are located in the same location as the user.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a signalling diagram of a process for determining presence status in accordance with one embodiment.

DETAILED DESCRIPTION OF THE DRAWINGS

Figure 1:
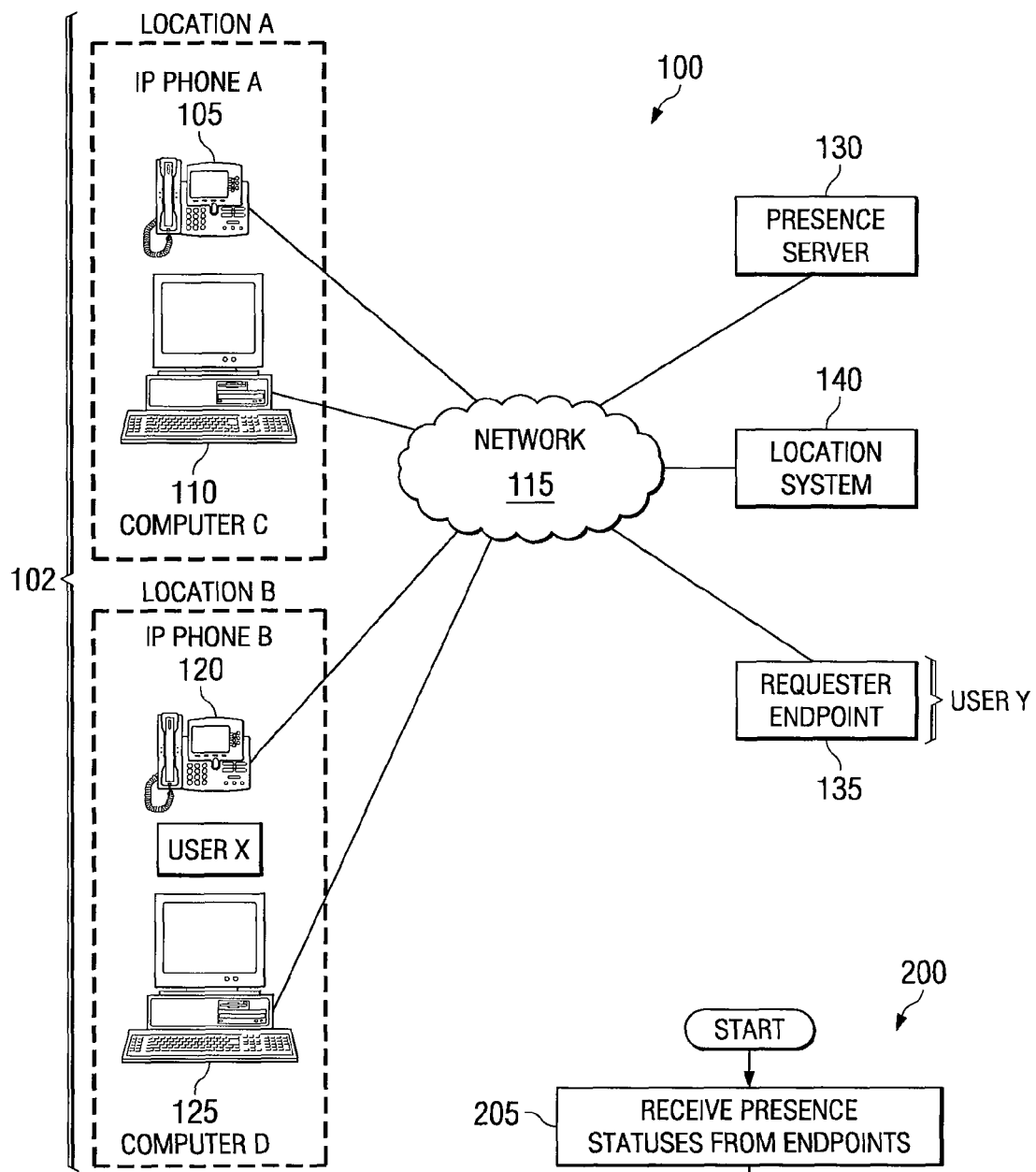
FIG. 1 is a block diagram of a system for determining presence status in accordance with one embodiment.

FIG. 1 is a block diagram of a system 100 for determining presence status in accordance with one embodiment. In the illustrated embodiment, the system 100 includes components such as user endpoints 102 associated with a user X, a network 115, a presence server 130, a requester endpoint 135 associated with a user Y, and a location system 140 coupled as shown. In the embodiment, an endpoint 102 has an associated presence status that is sent to the presence server 130. The location system 140 determines location information that describes the locations of the user endpoints 102. The presence server 130 determines an aggregate presence status of user X using the endpoint presence statuses and the location information. The presence server 130 may send the aggregate presence status to the requester endpoint 135 associated with user Y.

A user may be, but is not limited to, an entity that operates an endpoint 102, has a user account, subscribes to a service, and/or registers using an endpoint 102. An entity may be a person or group of people, a company, or other organization, or other suitable entity.

A user endpoint 102 represents a communication device that may be used to communicate with a communication network. Examples of user endpoints 102 include a computer, a mobile device, an Internet Protocol (IP) telephone, a personal digital assistant (PDA), a cellular phone, a standard telephone, or any other communication device operable to communicate with a communication network. In the particular embodiment illustrated in FIG. 1, the user endpoints 102 include an IP phone A 105, a computer 110, an IP phone B 120, and a computer D 125.

A user endpoint 102 may be associated with a user. In one embodiment, a user endpoint 102 may be associated with a user if the endpoint 102 is registered with the user's account. For example, a cell phone may be registered with a particular user account. In another embodiment, a user endpoint 102 may be associated with a user when the endpoint 102 is used to log in to the user's account. For example, user X may use computer C 110 to log into user X's account.

In the illustrated embodiment, the IP phone A 105 and the computer C 110 are co-located at a Location A, and the IP phone B 120 and the computer D 125 are co-located at a Location B. User endpoints 102 may be co-located if they are located sufficiently close to each other to be accessible to a particular user. For example, co-located user endpoints 102 may be located less than 100, 50, 25, 10, or 5 feet apart from each other, or may be located in the same room, building, office, or other area. Certain user endpoints 102 may be co-located with a user. That is, the user may actually be in the same location as the user endpoints 102.

A user endpoint 102 has an associated presence status that describes attributes and capabilities of the user endpoint. The attribute of a user endpoint 102 describes the current status of the user endpoint 102, which may be given by the current state of the user endpoint 102. Examples of states include AVAILABLE, IDLE, or NOT AVAILABLE states. An AVAILABLE state indicates that the user endpoint 102 is currently active and available to accept a call or other communication. An IDLE state indicates that the user endpoint is not currently active and cannot accept a call. A NOT AVAILABLE state indicates that the user endpoint may be active, but is not available to accept a call. Examples of NOT AVAILABLE states include a DO NOT DISTURB, ON THE PHONE, NOT AVAILABLE, or ON VACATION states. The user endpoint 102 may be placed in any suitable state either by the user or automatically by the user endpoint 102.

The capability of a particular user endpoint 102 refers to the communication functionality of the user endpoint 102. Examples of capabilities include voice, instant messaging (IM), video (high-quality and low-quality), data sharing, bandwidth, print, mobility and/or other capabilities.

The location system 140 determines the locations of the user endpoints 102. In one embodiment, the location system 140 determines which user endpoints 102 are co-located. The location system 140 may then provide the co-location information to the presence server 130. In the illustrated embodiment, the location system 140 determines that the IP phone A 105 and the computer C 110 are located at Location A, and that the IP phone B 120 and the computer D 125 are located at Location B. In various embodiments, the location system 140 may be integrated into the presence server 130.

In accordance with various embodiments, the location system 140 can use any suitable procedure to determine if user endpoints 102 are co-located. In one embodiment, proximity of activity may be used to determine co-location. For example, if user endpoints 102 have activity within a particular time period of each other, the user endpoints 102 may be designated as co-located. Examples of time periods include 20 seconds, one minute, five minutes, and ten minutes.

In other embodiments, co-location can be determined by detecting the location of user endpoints 102. Examples of procedures for detecting location include wireless or wired sensing, beacon tracking, and radio-frequency identification (RFID) tracking. In still other embodiments, port scanning to detect connections of user endpoints 102 to the network 115 can be used to determine location.

In other embodiments, co-location of user endpoints 102 can be determined by geocoding the locations of the user endpoints 102. For example, an administrator or user may enter the locations of the user endpoints 102. In still other embodiments, co-location of user endpoints 102 can be determined by detecting interconnection between user endpoints 102. For example, IP phone A 105 may be plugged into computer C 110. The interconnection may be detected, and the IP phone A 105 may be designated as co-located with the computer C 110.

In still other embodiments, co-location of user endpoints 102 can be determined by heuristic procedures, such as time of day procedures. For example, if user endpoints 102 have been co-located at a particular time of day in the past, the user endpoints 102 may be designated as co-located at that time in the future.

The presence server 130 determines the aggregate presence status of user X. The aggregate presence status includes an aggregate attribute indicating the availability of the user X, and at least one aggregate capability provided by the user endpoints 102 available to the user X. In one embodiment, the aggregate attribute takes into account the aggregate attributes of user endpoints 102 co-located with user X, as well as aggregate user endpoint capabilities available at the location of user X. In this embodiment, the aggregate presence status does not take into account the attributes and capabilities of the user endpoints 102 that are not co-located with user X.

An aggregate attribute describes the availability of a user and may be determined from the states of the user endpoints 102 co-located with the user. In one embodiment, the aggregate attribute is AVAILABLE if any of the user endpoints 102 are in an AVAILABLE state. For example, if a user's computer an/or phone co-located with the user is in an AVAILABLE state, the aggregate attribute is AVAILABLE.

Aggregate capabilities describe the capabilities available to the user. In one embodiment, the aggregate capabilities include the capabilities of the user endpoints 102 that are co-located with the user. In the present example, the aggregate capabilities include the capabilities of both the computer and the phone.

In one embodiment, the presence server 130 determines if there is significant activity on any of the user endpoints 102 to determine the location of user X. Significant activity can be an activity that indicates that the user endpoint 102 to be in an ACTIVE state, such as an AVAILABLE state. A PC transitioning from an IDLE to ACTIVE state is one example of significant activity. Another example of significant activity is a phone taken off hook. A user endpoint 102 in an IDLE or a DO NOT DISTURB state are examples of non-significant activity. If there is significant activity at a location, the user is determined to be at the location.

In one example, IP phone A 105 has a voice capability and is set to DO NOT DISTURB, IP phone B 130 has a voice capability and is set to ON THE PHONE, computer C 110 has voice and instant messaging (IM) capabilities and is set to IDLE, and computer D 125 is OFF (or not available). IP phone B 120 exhibits significant activity, so the user X is determined to be at Location B. Since computer D 125 is OFF, the capabilities of computer D 125 are not available to the user X. Accordingly the aggregate presence status of the user X is to be ON THE PHONE with voice capability only.

In another example, IP phone A 105 has voice capability and is set to DO NOT DISTURB, IP phone B 130 has voice capability and is set to ON THE PHONE, computer C 110 is OFF, and computer D 125 has voice, instant messaging (IM), and video capabilities and is set to IDLE. IP phone B 120 exhibits significant activity, so the user X is determined to be at Location B. The aggregate presence status of the user X is ON THE PHONE with voice, IM, and video capabilities.

In still another example embodiment, IP phone A 105 has voice and video capabilities and is set to IDLE, IP phone B 130 has voice capability and is set to IDLE, computer C 110 is in an active state, and computer D 125 has voice and instant messaging (IM) capabilities and is set to IDLE. The computer C 110 exhibits significant activity, so the user X is determined to be at Location B. The aggregate presence status is AVAILABLE with voice, IM, and video capabilities. At a later time, computer C 110 is turned off or goes IDLE, and computer D 125 becomes active. The user X is determined at the Location B. Because computer D does not have video capability, aggregate presence status becomes AVAILABLE with voice and IM capabilities.

In one embodiment, the presence server 130 receives presence status information from user endpoints 102 and location information from the location system 140. The presence server 130 may receive the information when the user endpoints 102 are initialized, and may receive updated information as the information changes. The presence server 130 may store the information in an associated memory along with information identifying the user endpoints 102 as being associated with the user X.

The requester endpoint 135 sends a presence status request to the presence server 130. The request may be sent by user Y. In accordance with various embodiments, the requester endpoint 135 can include a user endpoint such as a computer, a mobile device, an IP telephone, or any other user communication device. In some embodiments, the presence status request may be implicit, for example, may be a previous subscriber request for presence status.

In response to the presence request, the presence server 130 sends the aggregated presence status associated with user X to the requester endpoint 135. The requester endpoint 135 can then use this information to determine how to initiate communication with user endpoints 102 using one or more of the capabilities indicated by the aggregate presence status.

A component of system 100 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

In one embodiment, the presence server 130 is operable to determine a presence status associated with a user includes a memory and one or more processors. The memory stores presence statuses of endpoints. The one or more processors are operable to establish that an endpoint exhibits significant activity, and determines whether any other endpoint is co-located with that endpoint. The one or more processors are further operable to generate an aggregate presence status from the presence status of the at least one endpoint and presence status of the other endpoint.

Modifications, additions, or omissions may be made to system 100 without departing from the scope of the invention. The components of system 100 may be integrated or separated. For example, presence server 130 and location system 140 may be integrated. Moreover, the operations of system 100 may be performed by more, fewer, or other components. Additionally, operations of system 100 may be performed using any suitable logic comprising software, hardware, other logic, or any suitable combination of the preceding. As used in this document, "each" refers to each member of a set or each member of a subset of a set.

Figure 2:
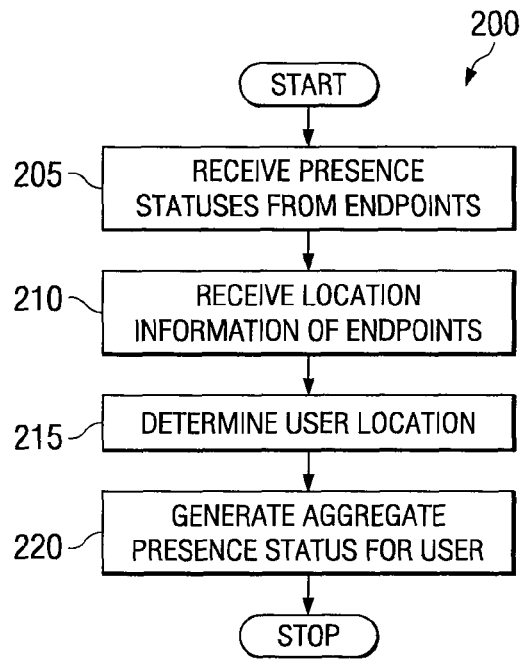
FIG. 2 is a flow diagram of a process for determining presence status in accordance with one embodiment.

FIG. 2 is a flow diagram of a process 200 for determining presence status in accordance with one embodiment. In step 205, the presence server 130 receives presence statuses of user endpoints 102. For example, in the embodiment illustrated in FIG. 1, the presence server 130 may receive presence statuses from the IP phone A 105, the computer C 110, the IP phone B 120 and the computer D 125. In one example, the IP phone B 120 and computer D 125 are AVAILABLE, and the IP phone A 105 and the computer C 110 are NOT AVAILABLE.

Location information associated with the user endpoints 102 is received by the presence server 130 in step 210. The location information indicates the co-location the user endpoints 102. In the embodiment illustrated in FIG. 1, the location information indicates that the IP phone A 105 and the computer C 110 are co-located at Location A, and that the IP phone B 120 and the computer D 125 are co-located at Location B. In one embodiment, the location information may be provided by a location system 140. In another embodiment, the location information may be determined by the presence server 130.

In step 215, the user location is determined by the presence server 130 from the presence statuses received from the user endpoints 102 and the received location information. In an example embodiment, the presence server 130 determines that user X is at Location B and co-located with IP phone B 120 and computer D 125.

Aggregate presence status for the user is generated in step 220. The aggregate presence status for the user includes the aggregate attribute indicating availability of the user X and aggregated capabilities of the user endpoints 102 that are at the user's location. In the described example embodiment, the aggregate presence status for user X is determined to include an aggregate attribute of AVAILABLE and aggregate capabilities that include the capabilities of the IP phone B 120 and the computer D 125. In some embodiments, this aggregation includes filtering out devices that are not co-located with the device exhibiting significant activity and performing a logical union of the attributes of the remaining devices.

Modifications, additions, or omissions may be made to the method without departing from the scope of the invention. The method may include more, fewer, or other steps. Additionally, steps may be performed in any suitable order. For example, step 210 may be performed prior to, at the same time as, or after step 205 is performed.

FIG. 3 is a signalling diagram of a process 300 for determining presence status in accordance with one embodiment. In step 305, IP phone A 105 is turned on. The IP phone A 105 registers with the presence server 130 as being associated with user X in step 310. In some embodiments, this registration may be performed on behalf of the IP phone A 105, such as by a central server (for example, a call manager) that controls the IP phone A 105. In step 315, the user X sets the status of the IP phone A 105 as Do Not Disturb (DND). The IP phone A 105 sends a message to the presence server 130 that the presence status of the IP phone A 105 is Do Not Disturb (DND) in step 320.

In step 325, the computer C 110 is turned on. The computer C 110 registers with the presence server as being associated with user X in step 330. In step 335, the location system 140 sends co-location information to the presence server 130 indicating that the IP phone A 105 and the computer C 110 are co-located at Location A.

IP phone B 120 turns on in step 340. In step 345, IP phone B 120 registers with the presence server as being associated with user X. In step 350, the computer D 125 is turned on. The computer D 125 registers with the presence server 130 as being associated with user X in step 355. The location system 140 sends co-location information to the presence server 130 indicating that the IP phone B 120 and the computer D 125 are co-located at Location B in step 357.

In step 360, user X picks up IP phone B 120. The IP phone B 120 sends a message to the presence server 130 indicating that the IP phone B 120 is in an "On The Phone" state in step 365. In step 370, computer C 110 detects that no activity has taken place, puts itself in an IDLE state. In step 375, the computer C 110 sends a message to the presence server 130 indicating that the computer C 110 is in an IDLE state.

In step 380, a user Y subscribes to the presence status of user X through requester endpoint 135. The requester endpoint 135 sends a subscribe message to the presence server 130 in step 385. In step 390, the presence server 130 determines the aggregate presence of the user X, which includes an aggregate attribute and aggregate capabilities. In some embodiments, step 390 may include the presence server 130 querying the location system 140 for co-location information for use in determining the aggregate presence status of user X. The aggregate attribute indicates that the user X is "On The Phone". The aggregate capabilities indicate that the user X has the capabilities provided by IP phone B 120 and computer D 125. In step 395, the presence server 130 sends the aggregate presence status of user X to the requester endpoint 135.

A user endpoint 102 may change state and/or capabilities. In the illustrated example, the user X hangs up the IP phone B 120 in step 392. In step 392, the IP phone B 120 sends a "hang up" message to the presence server 130. The presence server 130 determines an updated aggregate presence status reflecting the changed state in step 400. In the illustrated example, an updated aggregate attribute indicates that the user X is AVAILABLE, and updated aggregate capabilities indicates that the user X has the capabilities provided by IP phone B 120 and computer D 125. In step 405, the presence server 130 sends the updated aggregate presence status to the requester endpoint 135. The method then ends.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that an aggregate presence status associated with a user having multiple endpoints may be generated. The aggregate presence status describes the availability of the user as well as the capabilities of the user endpoints available to the user. Another technical advantage of one embodiment may be that the aggregate presence status describes user endpoints that are located in the same location as the user.

Although the present invention has been described with several embodiments, a myriad of changes, variations, alterations, transformations, and modifications may be suggested to one skilled in the art. It is intended that the present invention encompass such changes, variations, alterations, transformations, and modifications as fall within the scope of the appended claims.

What is claimed is:

1. A method of determining a presence status associated with a user, comprising:
   receiving a plurality of presence statuses of a plurality of endpoints associated with a first user;
   determining that at least one of the plurality of endpoints exhibits significant activity;
   determining that a second endpoint is co-located with the at least one endpoint;
   generating an aggregate presence status associated with the first user from the presence status of the at least one endpoint, the significant activity exhibited by the at least one endpoint, and the presence status of the second endpoint co-located with the at least one endpoint, wherein:
   the aggregate presence status indicates the location and availability of the first user; and
   the aggregate presence status comprises an aggregate capability indicating at least one communication capability associated with the second endpoint.

2. The method of claim 1, wherein the aggregate presence status comprises at least one aggregate attribute indicating an availability of the first user.

3. The method of claim 1, wherein the aggregate capability provided further indicates at least one communication capability associated with the at least one endpoint.

4. The method of claim 1, wherein determining that at least one of the plurality of endpoints exhibits significant activity comprises determining that the at least one endpoint is available.

5. The method of claim 1, further comprising:
   receiving a request for the aggregate presence status from a requester endpoint associated with a second user; and
   sending the aggregate presence status to the requester endpoint.

6. The method of claim 1, further comprising:
   initiating communication between a requester endpoint and the at least one endpoint using a capability indicated by the aggregate presence status.

7. The method of claim 1, further comprising:
   receiving an updated presence status for an endpoint of the plurality of endpoints; and
   generating an updated aggregate presence status in response to the updated presence status.

8. Logic for determining a presence status associated with a user, the logic embodied in computer-readable storage media and when executed by a computer operable to:
   receive a plurality of presence statuses of a plurality of endpoints associated with a first user;
   determine that at least one of the plurality of endpoints exhibits significant activity;
   determine that a second endpoint is co-located with the at least one endpoint; and
   generate an aggregate presence status associated with the first user from the presence status of the at least one endpoint, the significant activity exhibited by the at least one endpoint, and the presence status of the second endpoint co-located with the at least one endpoint, wherein:
   the aggregate presence status indicates the location and availability of the first user; and
   the aggregate presence status comprises an aggregate capability indicating at least one communication capability associated with the second endpoint.

9. The logic of claim 8, wherein the aggregate presence status comprises at least one aggregate attribute indicating an availability of the first user.

10. The logic of claim 8, wherein the aggregate capability further indicates at least one communication capability associated with the at least one endpoint.

11. The logic of claim 8, further operable to determine that at least one of the plurality of endpoints exhibits significant activity by determining that the at least one endpoint is available.

12. The logic of claim 8, further operable to:
   receive a request for the aggregate presence status from a requester endpoint associated with a second user; and
   send the aggregate presence status to the requester endpoint.

13. The logic of claim 8, further operable to:
initiate communication between a requester endpoint and the at least one endpoint using a capability indicated by the aggregate presence status.

14. The logic of claim 8, further operable to:
receive an updated presence status for an endpoint of the plurality of endpoints; and
generate an updated aggregate presence status in response to the updated presence status.

15. A presence server operable to determine a presence status associated with a user, comprising:
a memory operable to:
store a plurality of presence statuses of a plurality of endpoints associated with a first user;
one or more processors operable to:
determine that at least one of the plurality of endpoints exhibits significant activity;
determine that a second endpoint is co-located with the at least one endpoint; and
generate an aggregate presence status associated with the first user from the presence status of the at least one endpoint, the significant activity exhibited by the at least one endpoint, and the presence status of the second endpoint co-located with the at least one endpoint, wherein:
the aggregate presence status indicates the location and availability of the first user; and
the aggregate presence status comprises an aggregate capability indicating at least one communication capability associated with the second endpoint.

16. The presence server of claim 15, wherein the aggregate presence status comprises at least one aggregate attribute indicating an availability of the first user.

17. The presence server of claim 15, wherein the aggregate capability further indicates at least one communication capability associated with the at least one endpoint.

18. The presence server of claim 15, wherein the one or more processors are operable to:
determine that at least one of the plurality of endpoints exhibits significant activity by determining that the at least one endpoint is available.

19. The presence server of claim 15, the one or more processors further operable to:
receive a request for the aggregate presence status from a requester endpoint associated with a second user; and
send the aggregate presence status to the requester endpoint.

20. The presence server of claim 15, the one or more processors further operable to:
initiate communication between a requester endpoint and the at least one endpoint using a capability indicated by the aggregate presence status.

21. The presence server of claim 15, the one or more processors further operable to:
receive an updated presence status for an endpoint of the plurality of endpoints; and
generate an updated aggregate presence status in response to the updated presence status.

\* \* \* \* \*